Jan. 9, 1940.   H. B. MENARDI   2,186,876
PROCESS FOR THE PRODUCTION OF MERCURY FROM ORES
Filed Jan. 17, 1938
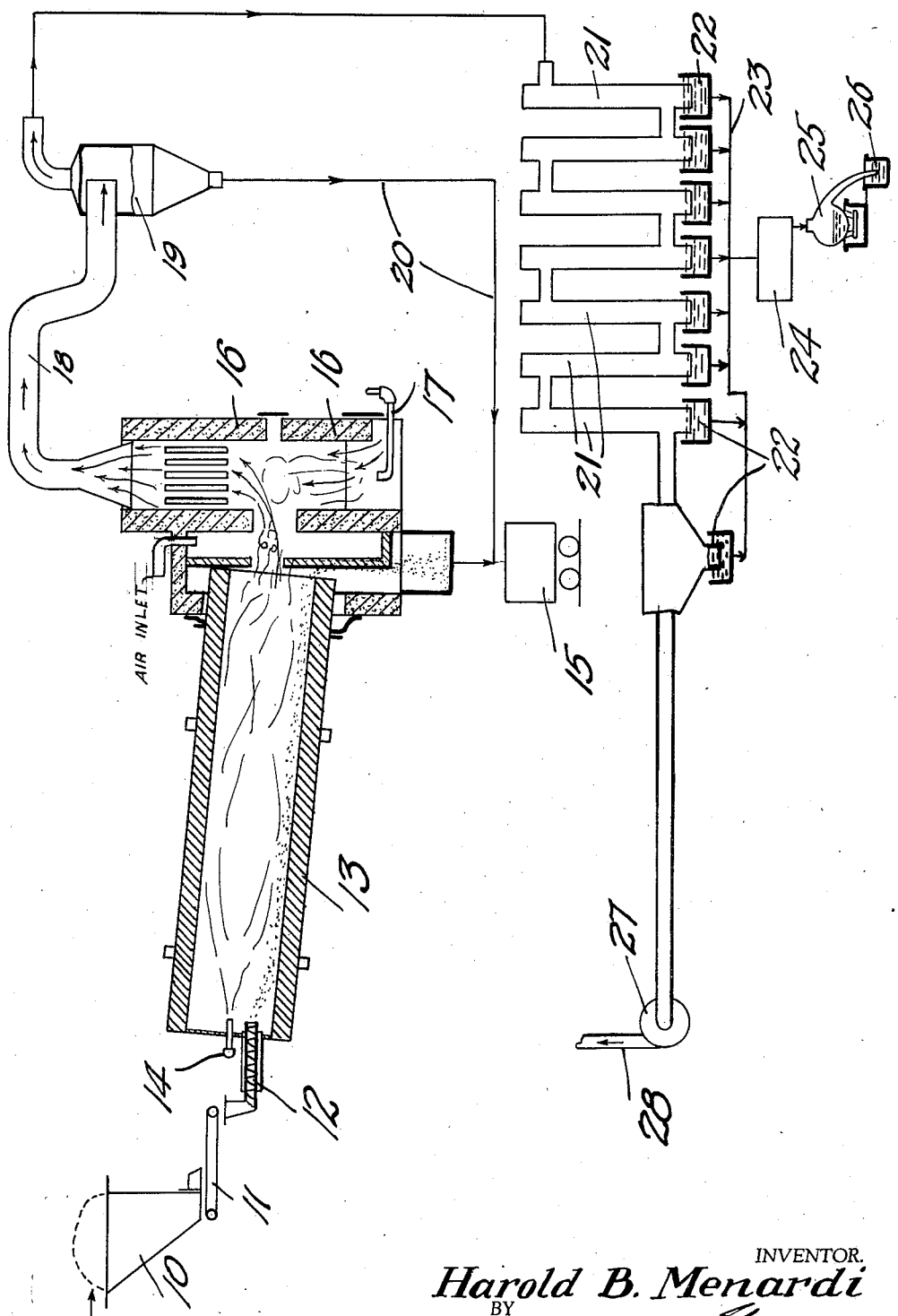
INVENTOR.
Harold B. Menardi
BY
ATTORNEY.

Patented Jan. 9, 1940

2,186,876

UNITED STATES PATENT OFFICE 2,186,876

PROCESS FOR THE PRODUCTION OF MERCURY FROM ORES

Harold B. Menardi, Los Angeles, Calif.

Application January 17, 1938, Serial No. 185,409

5 Claims. (Cl. 75—81)

This invention relates to the treatment of ores of certain metals, and particularly to the ores of mercury and antimony for the purpose of recovery of those metals or their compounds.

Mercury occurs in nature principally as a sulphide, which is known as cinnabar. Mercury can be obtained from this ore by a roasting process consisting in passing hot products of combustion containing excess air into the ore so that the oxygen in the excess air will react chemically with the ore to form mercury and sulphide dioxide. The mercury passes off in vapor form to be collected and liquefied through a suitable condensing apparatus. However well this procedure functions with cinnabar, it is inapplicable to mercury ores containing other elements, such as chlorine, selenium, tellurium, antimony, arsenic, etc., for the reason that separation between the mercury and the other elements cannot be effected by the roasting operation inclusive of the passage of excess air or oxygen over the ore. Accordingly, it becomes an object of this invention to obtain mercury from its ores, particularly those ores containing compounds of mercury with other metals or elements.

A further object of the invention resides in the separation of mercury from its ores and also the recovery of other metals or compounds contained in the ores.

My invention will be described with specific reference to the obtaining of mercury from Livingstonite, and it should be understood that in so doing the invention is not to be limited in its broad aspects to processing that particular ore, but that it is only one of many susceptible of reduction by the process now to be described.

The material initially acted upon in my process is concentrate or crushed ore containing a mixture of antimony sulphide and mercury sulphide minerals. To separate these compounds they are subjected to a roasting or retorting operation in a furnace at a temperature of approximately 1200 degrees F. If excess air were present, the oxygen therein would oxidize the antimony and prevent such separation from the mercury because of its relatively low temperature volatility. To avoid this difficulty, excess air is excluded from the gases in the furnace thereby maintaining them as a neutral or reducing atmosphere, the admission of air necessary for combustion being regulated so that the gases exhausting from the furnace do not contain more than 0.5 per cent free oxygen. Under this condition of operation the mercury sulphide is volatilized without chemical change while the antimony sulphide remains as such, or somewhat changed, in the furnace, being neither oxidized nor otherwise altered to a compound that is volatile at the furnace temperature.

The volatile products thus produced, including the mercury sulphide, are withdrawn through suitable mechanical means, or by draught, and passed into another chamber in which they are mixed with an excess of oxygen or air. This mixture is then passed through a heating zone, as an open flame, where the combustible components of the volatile products are burned or oxidized; the mercury sulphide having chemical reaction with the oxygen to produce metallic mercury vapor and sulphur dioxide.

The volatile products formed by this stage in the process, containing mercury as a metallic vapor, are passed into a standard condensing system, where the mercury vapor is cooled with the mercury being deposited in a liquid form (free from antimony) and as "Soot."

Recovery of the antimony compounds can be had from the residue of material left in the furnace, after the volatilization of the mercury sulphide, by discharging the residue from the furnace and cooling it in an air-tight cooling chamber from which air has been excluded for the purpose of preventing oxidation of the antimony compounds of the residue into volatile antimony oxides. After cooling, and in view of the fact that mercury is no longer present, the residue can be treated in known manners for the recovery of antimony sulphide (known as antimony crude), roasted in air to produce antimony oxide, or treated by any other known processes for the utilization of antimony compounds.

The essential parts of a specific apparatus for carrying out the aforementioned process are disclosed in the drawing. An ore, such as Livingstonite, is placed in a hopper 10 from where it will pass onto a belt feeder 11 for transmission to a water cooled screw conveyor 12 exiting into a rotary kiln 13, preferably inclined in order that the ore will be automatically fed therealong. A suitable gas burner 14 extends into one end of the kiln, the burner being adjusted to maintain a neutral or reducing atmosphere therein. As was previously stated, the mercury sulphide will be volatilized in the kiln substantially without chemical change while the antimony sulphide will remain substantially as such, the residue passing from the kiln into an air tight cooling chamber 15 from which air has been excluded. The residue including the antimony sulphide can be then treated to produce the above noted compounds.

The volatile products including the mercury sulphide will pass into a combustion chamber 16 in which they will pass through a heating zone in the nature of a flame supplied by a gas burner 17. Due to the excess air or oxygen present in this chamber, which is admitted through the lower open end thereof, the mercury sulphide will react therein to produce metallic mercury vapor and sulphide dioxide. These volatile constituents along with any other volatile products produced will pass out of the combustion chamber 16 and through the pipe 18 into a cyclone collector 19 where any dust present will be separated from the gases and deposited into a line 20 leading into the cooling chamber 15. The volatile products including the mercury vapor will be conducted into a bank of suitable condensers 21, which can be either dry steel condensers, wet tile condensers, or both, where the mercury vapor will be cooled and deposited in liquid form into traps 22 from where the liquid will flow through a common line 23 to a Hoe table 24 and then into suitable containers, as a retort 25 and trap 26.

At the end of the condensers is a suction fan 27 for delivering the gases and any uncondensed fumes from the condensers to the chimney 28.

I claim:

1. Process of recovering mercury from ores or concentrates containing mercury sulphide and an antimony compound which comprises heating said ore or concentrate in a non-oxidizing atmosphere to volatilize said mercury sulphide without volatilizing said other elements, said mercury sulphide remaining substantially unchanged chemically.

2. Process of recovering mercury from ores or concentrates containing mercury sulphide and other elements which comprises heating said ore or concentrate in a non-oxidizing atmosphere to vaporize said mercury sulphide without volatilizing said other elements, and oxidizing the vapor to produce metallic mercury.

3. Process of recovering mercury from ores or concentrates containing mercury sulphide and an antimony compound which comprises heating said ore or concentrate in a non-oxidizing atmosphere to vaporize said mercury sulphide without volatilizing said other elements, and oxidizing the vapor to produce metallic mercury.

4. Process of recovering antimony compounds from ore or concentrates containing mercury which comprises heating said ore or concentrate in a non-oxidizing atmosphere to vaporize said mercury without volatilizing said antimony compound, and cooling the residue containing said antimony compound in a non-oxidizing atmosphere.

5. Process of recovering mercury from ores or concentrates containing mercury sulphide and antimony sulphide which comprises heating said ore or concentrate in a non-oxidizing atmosphere to vaporize said mercury sulphide without vaporizing said antimony sulphide, separating said vaporized mercury sulphide from said antimony sulphide, and passing said vaporized mercury sulphide through an oxidizing atmosphere to produce metallic mercury.

HAROLD B. MENARDI.